US005879508A

United States Patent [19]

[11] Patent Number: 5,879,508

[45] Date of Patent: Mar. 9, 1999

Mäkinen

[54] METHOD AND ASSEMBLY FOR PLACING A LABEL ONTO THE HEAD OF PAPER ROLL

[75] Inventor: Jukka Mäkinen, Hollola, Finland

[73] Assignee: Valmet Coperation, Helsinki, Finland

[21] Appl. No.: 947,117

[22] Filed: Sep. 17, 1992

[30] Foreign Application Priority Data

Sep. 17, 1991 [FI] Finland .................................... 914355

[51] Int. Cl.[6] ........................................................ B32B 31/00

[52] U.S. Cl. ........................... 156/571; 156/556; 156/285

[58] Field of Search ..................................... 156/285, 358, 156/387, 556, 565, 564, 572, 573, 574, 578, DIG. 32, DIG. 35

[56] References Cited

U.S. PATENT DOCUMENTS

| | | | |
|---|---|---|---|
| 3,243,329 | 3/1966 | Anderegg . | |
| 3,616,094 | 10/1971 | Navin | 156/572 X |
| 3,708,375 | 1/1973 | Kistner | 156/572 X |
| 3,955,481 | 5/1976 | Heitmann | 156/578 X |
| 4,618,392 | 10/1986 | Uchimura et al. | 156/DIG. 31 X |
| 4,696,715 | 9/1987 | Bahr | 156/571 X |
| 4,725,327 | 2/1988 | Matuda et al. | 156/571 X |
| 4,844,771 | 7/1989 | Crankshaw et al. . | |
| 4,895,614 | 1/1990 | Trouteaud et al. | 156/571 X |
| 5,024,718 | 6/1991 | Hannen . | |

FOREIGN PATENT DOCUMENTS

| | | |
|---|---|---|
| 0454472 A2 | 9/1991 | European Pat. Off. . |
| 1511869 | 12/1970 | Germany . |

OTHER PUBLICATIONS

Finnish Office Action dated Apr. 22, 1992 for Finnish priority application No. 914355 citing above references.

*Primary Examiner*—James Engel
*Attorney, Agent, or Firm*—Cohen, Pontani, Lieberman & Pavane

[57] ABSTRACT

This patent publication discloses a method and assembly for placing an identification label to the end of a paper roll (1). Prior-art methods for placing the label have been hampered by the long duration of the work cycle caused by the picking movement of the label. According to the present invention the label is picked by means of a clamp element (7) from a slanted surface inclined at an angle of, e.g., 45° from horizontal and transferred to the end of the roll (1) via an activation phase of the adhering surface by way of a continuous horizontal transfer movement, thus achieving a short work cycle. The assembly designed to implement the method performs the transfer movements by means of an arm (6) travelling along a guide rail (5) and a clamp element (7) connected by a joint (8) to the end of the arm (6).

7 Claims, 1 Drawing Sheet

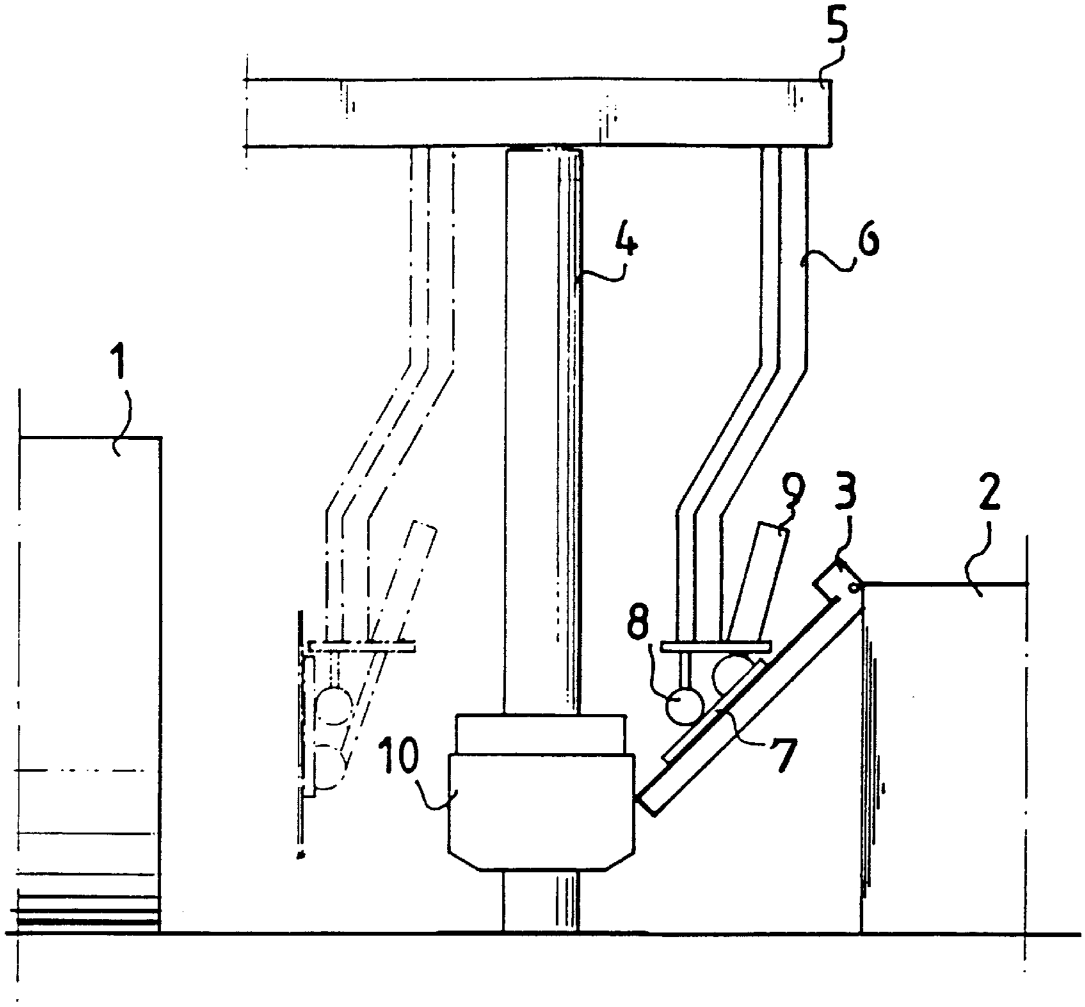
5
4
6
1
9
3
2
8
10
7

METHOD AND ASSEMBLY FOR PLACING A LABEL ONTO THE HEAD OF PAPER ROLL

The present invention relates to a method according to the preamble of claim 1 for placing an identification label onto the end of a wrapped paper roll.

The invention also concerns an assembly according to the preamble of claim 4.

Paper rolls are packaged in modern paper mills on highly automated packaging lines after slitting to desired width and wrapping of the rolls. The rolls to be wrapped are identified prior to the wrapping station and headers of correct size as well as a wrapper of proper grade and size are selected automatically. The rolls are brought in an appropriate manner onto the support rolls of the wrapping station, the inner headers are placed onto the ends of each roll, the wrapper is placed about the roll by rotating the roll on the support rolls and then folding the edges of the wrapper over the rims the inner headers. Finally, the outer headers are adhered to the ends of the roll by means of heatable press platens. Each wrapped roll is marked and transported to the storage areas.

The labels are produced with the help of a suitable printer automatically filled with the roll identification information available from the data processing system of the wrapping system. The printed labels are attached to the roll with the help of a manipulator. Typically, a portal manipulator is used for picking and attaching the labels. The labels are printed onto, e.g., continuous forms in a matrix printer, separated from the continuous form and fed to a picking conveyor. The picking conveyor is usually a vacuum-clamping conveyor equipped with one or more perforated conveyor bands. The separated label is held on the conveyor by means of suction acting via the holes perforated in the conveyor bands. Such a conveyor construction is reliable in use and permits a sufficiently accurate transport of the label to the desired picking point.

From the conveyor the label is picked by the vacuum clamp of the manipulator. The vacuum clamp is secured to the shaft of a long-stroke pneumatic cylinder and the cylinder is mounted onto the horizontally movable carriage of the portal manipulator. As the label reaches the picking point at the end position of the picking conveyor, the vacuum clamp performs a vertical downward picking stroke actuated by the cylinder, grabs the label by suction and lifts it upward from the conveyor. Next, the vacuum clamp is transferred horizontally by the motion of the carriage toward the roll. A water spray is located on the transfer route for wetting the adhesive-coated underside of the label which is thereby activated. After label activation the vacuum clamp is rotated vertical so that the adhesive-coated side of the label faces the roll end. The clamp is brought into close proximity with the roll end, lowered to proper height for adhering the label and pressed against the roll end, whereby the label adheres to the roll, after which the vacuum is removed from the vacuum clamp and the homing movement of the clamp to the initial position is started.

The main disadvantage of such a method for attaching a label is the long duration of the work cycle. Consequently, such an arrangement cannot cope with the speeds of the fastest wrapping stations employed today. The long work cycle is caused by the need for transferring the manipulator over a relatively long vertical distance during both the picking and attachment of the label. The vertical movement is necessary, because the labels must be placed to the lower edge of the roll ends. This is because the diameter of rolls to be delivered from the mill to the customers varies, whereby the label is advantageously placed to the lower edge of the roll in the wrapping station, thus assuring that the label is positively located on the roll end without the need for a separate control of the label height position. In the above-described solution the length of vertical movements is further increased by the fact the label printer with its picking conveyor is mounted relatively high from the floor level. This is because of the height requirement of the printers employed.

Attempts have been made to shorten the cycle time by mounting the label printer below the floor level, whereby the picking conveyor becomes placed approximately at the floor level. In this embodiment the clamp need not be moved downward after the picking and water-spray activation of the label, since the clamp remains at the correct height after the picking phase. Such a solution already attains a relatively short cycle time, but the vertical transfer movement needed for picking cannot be eliminated. The embodiment is also extremely difficult to implement in practice, because the printer must be placed in a pit made in the factory building floor. The poor stiffness of a long pneumatic cylinder limits the transfer speed in both cases. Long-stroke cylinders are expensive, thus increasing the price of the labelling apparatus. The cost of such systems is further elevated by the more complicated sensor and control techniques and greater number of components necessitated by the increased number of transfer movements.

It is an object of the present invention to achieve a method for transfer and attachment of labels in which the number of necessary transfer movements is minimized, whereby a short work cycle time is attained.

The invention is based on picking the label by a clamp from a surface inclined from horizontal, moving the label toward the roll and rotating the label to a horizontal position about the mounting joint of the clamp during the transfer movement toward the roll.

More specifically, the method according to the invention is characterized by what is stated in the characterizing part of claim 1.

Furthermore, the apparatus according to the invention is characterized by what is stated in the characterizing part of claim 4.

The invention offers significant benefits.

The method according to the invention permits an essential shortening of the labelling work cycle in respect to prior-art methods. Label picking and attachment requires only two movements, both of which can be performed simultaneously. The construction of the present labelling assembly is simpler than that of conventional manipulator-type embodiments, since the vertical transfer movement is eliminated. The arm of the clamp can be made as a stiff box-section structure, whereby the construction becomes sufficiently stiff even for the highest operating speeds. Thus, the present invention provides a labelling apparatus, whose speed is sufficient for the needs of all wrapping stations employed in the art. The labelling apparatus can also be used in wrapping stations operating at speeds above those conventionally used today. The label printers can be freely located at the floor level without the need for any special arrangements. This offers significant cost reductions in layout planning and building costs. The assembly is easy to adapt as a replacement to slow-speed labelling apparatuses in the revamping of wrapping stations.

The invention is next examined in greater detail with the help of the attached drawing, which diagrammatically illustrates the construction and function of an assembly according to the invention.

The assembly has a portal-type construction analogous to those used in the art. The portal structure incorporates a horizontal guide rail 5 supported by two vertical columns 4. The horizontal guide rail 5 carries a movably mounted, essentially vertical arm 6, and a clamp platen 7 is mounted via a rotating joint 8 to the lower end of the arm 6. To the lower end of the arm 6 is also connected an actuator cylinder 9, whereby the body of the cylinder is connected to the lower end of the arm 6 and the cylinder rod to the clamp platen 7. These components comprise the transfer means of the label.

The left side of the diagram shows a paper roll 1 to be labelled and the right side a label printer 2 with its picking conveyor 3. The water spraying device 10 is mounted on the vertical column 4. The label printer 2 can be of any type with sufficient operating speed. The picking conveyor 3 is adapted unconventionally inclined at a 45° angle from horizontal. The conveyor 3 is a dual-band vacuum-clamping conveyor.

The clamp platen 7 with its arm 6 is shown by solid lines in the picking position and by dashed lines in the attachment position. The attachment of the label is carried out according to the invention as follows. The wrapped roll 1 is transferred from the wrapping station toward the labelling station by a conveyor, and simultaneously the control system of the wrapping station sends the data for labelling the roll 1 to a printer 2. The printer 2 prints the necessary labelling information onto a continuous form, after which the printed label is separated from the continuous form and fed to a picking conveyor 3. The label is clamped by vacuum onto the conveyor bands of the conveyor 3 and the bands transfer the label to the picking area at the end of the conveyor 3. At the picking area the upper surface of the conveyor 3 is typically inclined at a 45° angle from horizontal.

During the picking movement the clamp platen 7 is rotated by means of an actuator cylinder 9 about a joint 8 to a position parallel with the picking conveyor. The picking movement is performed by transferring the clamp platen 7 with its arm 6 along the horizontal guide rail 5 toward the picking conveyor. The clamp platen 7 is driven against the label by the horizontal movement and the label is adhered to the platen by vacuum. Next, the clamp platen 7 is again moved horizontally along the guide rail 5, but in this phase, toward the end of the paper roll 1. After outdistancing from the picking conveyor 3, the clamp platen 7 is rotated by means of the actuator cylinder 9 about the joint 8, until the clamp platen 7 with the label adhered onto it reaches the horizontal position. To accomplish this, the clamp platen 7 is rotated at this stage by approx. 45°. The horizontally aligned clamp platen 7 is transferred at the end of arm 6 over the water-spraying device 10. To activate the label, the water-spraying device 10 emits a fine spray of water onto the lower surface of the label.

After the clamp platen 7 has passed the water-spraying device 10, it is further rotated by the work stroke of the cylinder 9 by 90°, thus aligning the platen 7 with the adhering label vertical and parallel with the end of the wrapped roll 1. In this position the clamp platen 7 can now be moved against the end of the roll 1, whereby the label adheres to the roll 1. When the clamp platen 7 hits the end of the roll 1, vacuum is removed from the clamp platen allowing the platen 7 to be outdistanced from the roll 1, while the label remains adhered to the end of the roll 1. After the label is attached, the clamp platen 7 is transferred to pick the next label, or alternatively, to a home position close to the picking conveyor 3 along a return movement route in which the above-described phases are performed in a reversed order. The motion of the clamp platen 7 is halted only at the picking and attachment phases, while all other movements are performed in a stepless succession without any intermediate phases. So, the linear movement of the clamp platen 7 at the end of the arm 6 and the rotation of the clamp platen 7 occur simultaneously. Such an arrangement attains an extremely short duration of the work cycle.

Besides that described above, the present invention can have alternative embodiments.

For example, the construction of the support arm 6 can be varied from that illustrated in the diagram. The rotating actuator of the clamp platen 7 may be more advantageously implemented using a rotating actuator adapted integral with the rotating joint 8, such as an electric motor or a rotating hydraulic actuator. Then, the joint 8 can be placed in the middle of the clamp assembly and the arm 6 can be made straight. Several alternatives are possible for the rotating movement of the clamp platen, although those described above are evidently the simplest ones to implement. The horizontal movement of the clamp assembly can be implemented by other means different from the above-placed guide rail using, e.g., guide members mounted at the floor level or to the side, or alternatively, employing an articulated arm. Such embodiments will, however, be more complicated than those described for the exemplifying embodiments, so their use will be justified only in special applications.

The picking conveyor 3 can be any conveyor type, or alternatively, the conveyor can be entirely omitted if other arrangements are employed for feeding the label to the inclined picking position. The inclination of the upper surface of the picking station can be varied in a wide range. The largest possible inclination is 90°, which may cause problems in assuring the feed of the label to its picking position. Picking by a straight horizontal movement is in principle possible from a plane inclined at a desiredly small angle if the plane is only somewhat inclined from horizontal. In practice, picking will become complicated at angles smaller than 25°, whereby also the necessary stroke length of the picking movement starts to extend appreciably. Excluding special cases, angles smaller than this should not be used. Picking is easiest to implement from planes aligned to an angle of 70° . . . 35° from horizontal. Other kind of a picking member different from a vacuum clamp platen can also be employed. The water-soluble glue can be replaced by alternative label adhering methods.

I claim:

1. A method of placing a label onto an end of a paper roll, the method comprising placing the label on a planar surface which is inclined at an acute angle from the horizontal and is aligned facing the end of the paper roll, moving a clamp element having the same inclination as the planar surface in a first linear horizontal transfer movement against the label and clamping the label, removing the label from the planar surface by means of the clamp element by carrying out a second linear horizontal transfer movement parallel to the first horizontal transfer movement and directed away from the planar surface, activating one side of the label to obtain an adhering surface of the label, further moving the clamp element with the label in a third linear horizontal transfer movement also parallel with the first horizontal transfer movement toward the end of the paper roll, simultaneously rotating the clamp element with the label about a joint into a position extending vertically and parallel with the end of the paper roll, and pressing the adhering surface of the label against the end of the paper roll by the third horizontal transfer movement.

2. The method according to claim 1, wherein the second and third horizontal transfer movements are carried out as a continuous motion from lifting the label from the planar surface to pressing the label against the end of the paper roll.

3. The method according to claim 1, wherein the one side of the label is activated by applying a spray of water onto the one side of the label by means of a waters-praying device.

4. The method according to claim 1, wherein the clamp element is rotated about an angle of between 115° and 165°.

5. An assembly for placing a label onto an end of a paper roll, the assembly comprising a planar surface, means for placing the label onto the planar surface, the planar surface being inclined at an acute angle to the horizontal and facing the end of the paper roll, a clamp element for picking the label from the planar surface, support and transfer means for supporting and carrying out a linear and horizontal movement of the clamp element, the support and transfer means comprising a joint rotatable about at least one axis of freedom, the clamp element being connected to the support and transfer means through the joint, the support and transfer means further comprising an actuator for rotating the clamp element about the joint from an inclined position extending parallel to the planar surface into a position extending vertically and parallel to the end of the paper roll, and means for activating one side of the label to act as an adhering surface.

6. The assembly according to claim 5, wherein the means for activating one side of the label comprises a water-spraying device for applying a spray of water onto the one side of the label.

7. The assembly according to claim 5, wherein the planar surface is inclined relative to the horizontal by an angle of between 25° and 75°.

* * * * *